(12) United States Patent
Jones

(10) Patent No.: US 6,746,002 B2
(45) Date of Patent: Jun. 8, 2004

(54) FUEL EXPANSION SYSTEM

(76) Inventor: Thomas R. Jones, 350 Highway 95, Weiser, ID (US) 83672

( * ) Notice: Subject to any disclaimer, the term of this patent is extended or adjusted under 35 U.S.C. 154(b) by 0 days.

(21) Appl. No.: 10/138,186

(22) Filed: May 3, 2002

(65) Prior Publication Data

US 2002/0185756 A1 Dec. 12, 2002

Related U.S. Application Data

(60) Provisional application No. 60/288,630, filed on May 3, 2001.

(51) Int. Cl.⁷ ............................................. B01D 47/00
(52) U.S. Cl. ................... 261/64.4; 261/70; 261/119.2; 261/121.4; 261/127; 261/DIG. 83
(58) Field of Search ............... 261/64.4, 70, 119.2, 261/121.3, 121.4, 124, 127, 142, 143, 144, 145, DIG. 83

(56) References Cited

U.S. PATENT DOCUMENTS

| 474,838 A | 5/1892 | Lambert |
| 1,938,497 A | 12/1933 | Pogue .......................... 261/124 |
| 1,972,874 A | 9/1934 | Dobbs .......................... 261/121 |
| 2,030,922 A | * | 2/1936 | Hirth |
| 2,216,664 A | * | 10/1940 | Fremd, Jr. |
| 3,338,223 A | * | 8/1967 | Williams |
| 3,749,376 A | 7/1973 | Alm et al. .................. 261/18 A |
| 4,011,847 A | 3/1977 | Fortino ........................ 123/134 |
| 4,171,332 A | 10/1979 | Gohnert ..................... 261/78 R |
| 4,177,779 A | 12/1979 | Ogle ........................... 123/133 |
| 4,386,593 A | 6/1983 | Tibbs ........................ 123/523 |
| 4,421,087 A | 12/1983 | Schuurman ................. 123/445 |
| 4,858,582 A | 8/1989 | Brown ........................ 123/523 |
| 5,074,273 A | 12/1991 | Brown ........................ 123/538 |
| 5,117,794 A | 6/1992 | Leshner et al. ............. 123/444 |
| 5,580,309 A | 12/1996 | Piechowiak et al. |
| 5,800,264 A | 9/1998 | Pascal et al. |
| 5,833,537 A | 11/1998 | Barrie |
| 5,833,538 A | 11/1998 | Weiss |
| 5,833,540 A | 11/1998 | Miodunski et al. |
| 5,910,048 A | 6/1999 | Feinberg |
| 5,997,401 A | 12/1999 | Crawford |
| 6,004,207 A | 12/1999 | Wilson, Jr. et al. |
| 6,125,797 A | 10/2000 | Dupointe ............... 123/27 GE |

FOREIGN PATENT DOCUMENTS

GB 727333 3/1955

OTHER PUBLICATIONS

Copy of written opinion (PCT); 4 pages.

* cited by examiner

*Primary Examiner*—Scott Bushey
(74) *Attorney, Agent, or Firm*—Stephen M. Nipper; Robert L. Shaver; Frank J. Dykas

(57) ABSTRACT

A fuel expansion system or carburetor for internal combustion engines utilizing the bubbling of air through use of a number of bubble tubes through a supply of liquid fuel. The resulting atomized, vaporized and expanded fuel is then mixed with air and fed into the engine for combustion.

10 Claims, 2 Drawing Sheets

FUEL EXPANSION SYSTEM

INCORPORATION BY REFERENCE/PRIORITY

This application incorporates by reference Disclosure Document No. 466754, filed on Dec. 22, 1999. The application claims priority from and incorporates by reference co-pending provisional patent application No. 60/288,630, filed May 3, 2001, same inventor, same title.

BACKGROUND OF THE INVENTION

1. Field of the Invention

The present invention generally relates to internal combustion engine carburetors, and more particularly relates to carburetors utilizing the bubbling of air through gasoline to create gasoline vapor.

2. Background Information

Carburetors are used to mix air and gasoline vapor together to be burned in the internal combustion engine. The typical carburetor utilizes suction to atomize and vaporize gasoline or another liquid fuel source. These fuel vapors are then mixed with air and, through use of a throttle, are fed into the engine for burning.

Due to the ever rising price of gasoline and the continued popularity of motor vehicles as a mode of transportation, much effort in the prior art has been directed to increasing the efficiency of internal combustion engines. In addition, and often to the detriment of increasing the efficiency of internal combustion engines, further efforts in the prior art have been directed toward reducing the various pollutants emitted from motor vehicles. Needless to say, the prior art includes many different approaches to the problems of increasing the efficiency of internal combustion engines and for reducing the pollutants thereof.

The primary problem with the carburetors for internal combustion engines is that they are inadequate in breaking the fuel into small enough droplets. This results in relatively large droplets of fuel which will not completely vaporize in the intake manifold. The result is low engine operating efficiency with formation of carbon monoxide and high hydrocarbon emissions. It therefore becomes desirable to produce a carburetor improvement that will break up the larger droplets of fuel and disperse them more evenly, increasing the efficiency of the engine by burning more of the fuel.

The prior art knows many different means of atomizing and vaporizing the fuel. One method of vaporization system uses a source of air which is bubbled through a reservoir of the liquid gasoline, the resulting vapors being inputted into the combustion chamber of the engine. Various patents exist for similar types of devices, for instance, U.S. Pat. Nos. 474,838, 1,938,497, 3,749,376, and 4,011,847.

However, the achievements of the prior art have obviously not been as great as desired and it is clear that the need for greater fuel efficiency in internal combustion engines producing less pollutant emissions is still very much in existence and is one which is becoming increasingly critical.

SUMMARY OF THE INVENTION

The present invention is a fuel enriching carburetor device for an internal combustion engine. The preferred embodiment of the present invention utilizes a reaction chamber operable to hold liquid fuel (such as gasoline) at a selected level in the reaction chamber. Extending generally vertical through the reaction chamber are a plurality of air tubes. These air tubes have an open first end extending to an open second end. This first end being fluidly connected to a source of air, and the second end being submerged below the level of liquid fuel in the reaction chamber for collection of fuel vapors. Located within the reaction chamber is an air-fuel vapor chamber. The air-fuel vapor chamber further connects to at least one air-fuel vapor mixing conduit which is in fluid communication between the air-fuel vapor chamber of the reaction chamber and the intake manifold of said engine. The air-fuel vapor mixing conduit further provided with a mixing valve or throttle for controlling air-fuel ratio provided to the engine.

In use, air is passed through the air tubes and into the level of fuel in the reaction chamber, causing small bubbles to be bubbled through the liquid fuel present in the chamber. The resulting vapor is then expanded by the present vacuum energy and heat energy, mixed with air, and communicated to the engine for combustion.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
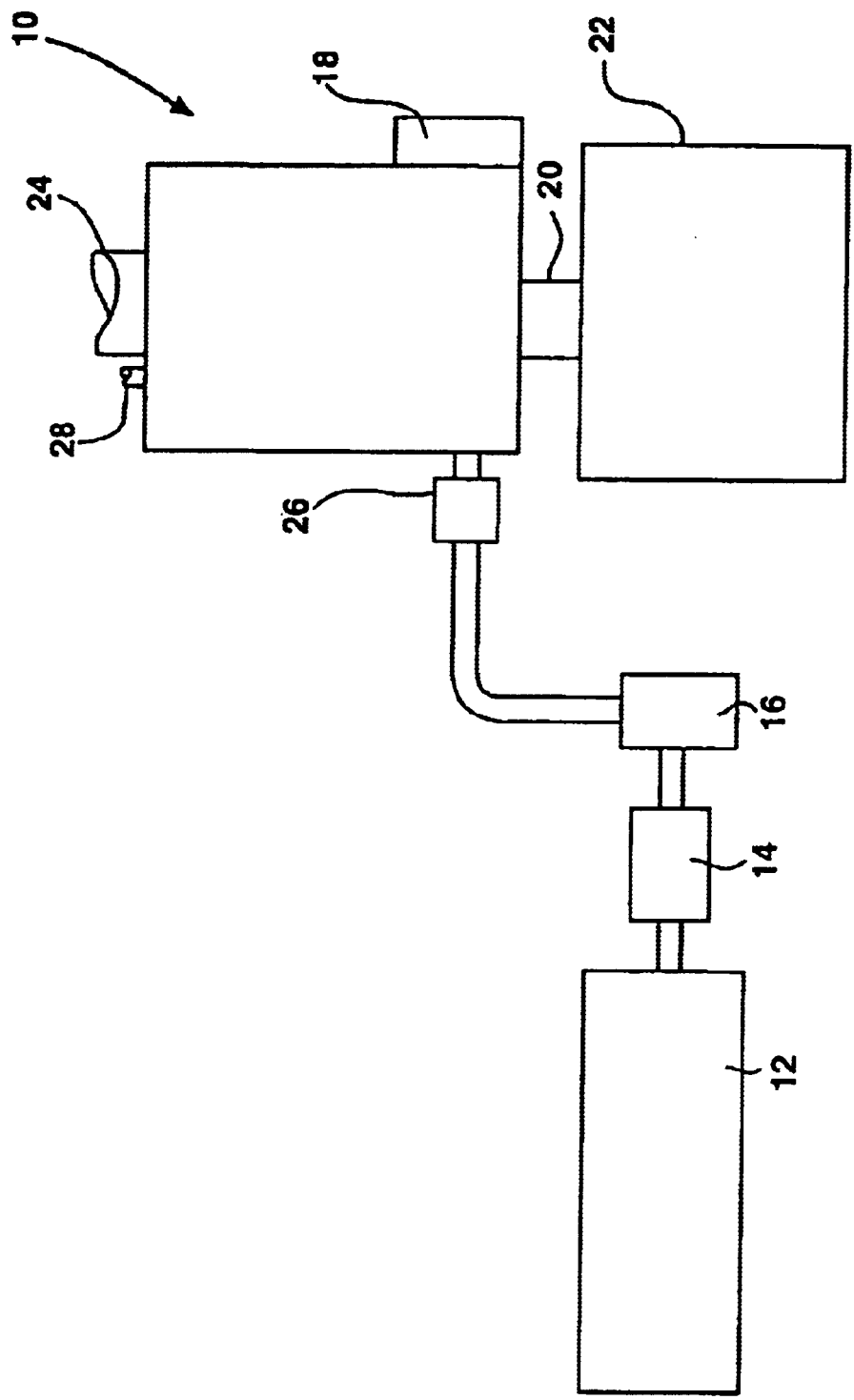
FIG. 1 is a schematic representation of one embodiment of the fuel system of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a fuel expanding and fuel enriching carburetor device for an internal combustion engine. While internal combustion engines are envisioned as the likely use of the present invention, it may also be able to be used on gasoline turbine engines, rotary type engines, and with any other manner of combusting liquid fuel.

Referring initially to FIG. 1, one embodiment of the present invention is shown in general schematic format. This embodiment of the invented device 10 is utilized with an internal combustion engine system. In this embodiment, a fuel tank 12 containing a supply of fuel is provided. The preferred fuel is gasoline in its liquid form. However, the present invention may be used on any form of liquid fuel which may be atomized, vaporized, or evaporated through use of the present invention, including, but not limited to methanol, ethanol, and petroleum based fuels. In the preferred embodiment, a pump 16 is utilized to pump fuel, preferably through a filter 14, from the fuel tank 12 to the device 10. Other means of supplying the device 10 with fuel are also envisioned, and many are well known to the public knowledge, including, but not limited to vacuum, gravity, etc.

It has been found sometimes that the present process results in fuel within the invented device 10 cooling to the point where efficiency is reduced. Thus, it is preferred that either incorporated into the device 10 itself or inline between the fuel tank 12 and the device 10 will be a preheater 26 for preheating the fuel. Through heating the fuel, this cooling effect, where present, can be overcome. It is preferred that the preheater 26 not cause the fuel to boil, but instead keep the fuel at a temperature between 100 and 130 degrees Fahrenheit. However, embodiments which accent the effects of the present invention 10 through additionally cold boiling the fuel are also envisioned. Examples of preheaters include, but are not limited to, a heating element located in the level of liquid fuel 26, an inline heater, or through heating the cooling system off the engine itself. It is preferred that the heating element or portion of the unit provide for a constant working temperature to enable the other elements of the unit to separate the molecular bonds that hold the hydrocarbons together.

It is preferred that the device 10 utilize a float chamber 18 or other means to regulate the level of fuel within the device 10, keeping the level at or within a predetermined depth. Such means is common in the prior art and all different manners of accomplishing this means are deemed included in this disclosure.

A bubbler air inlet 28 connected to an air source and an air-fuel ratio inlet 24 are also provided. Operably extending away from the device 10 is a mounting flange connection 20 connecting with the intake manifold 22 of the internal combustion engine.

Figure 2:
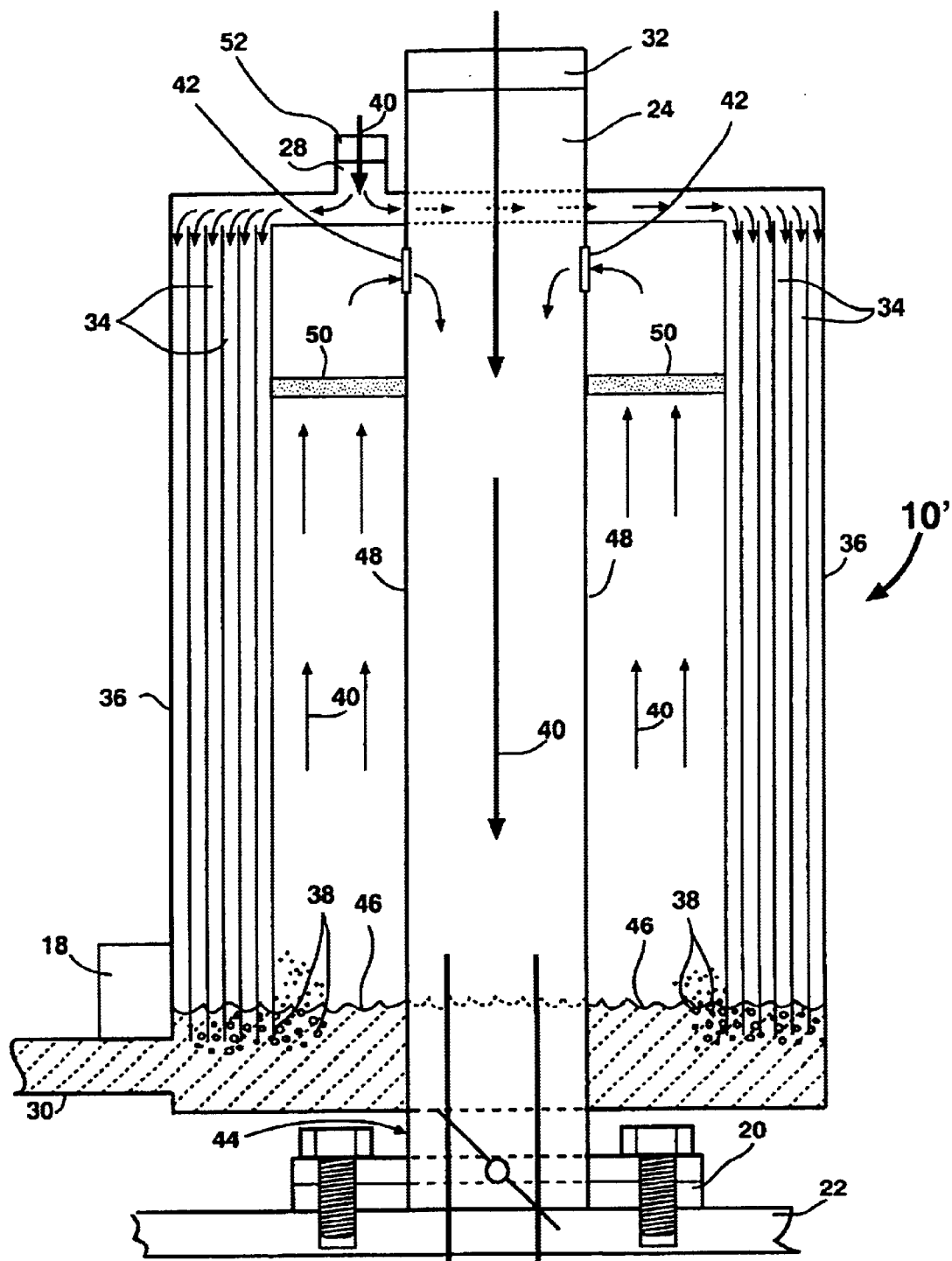
FIG. 2 is a side, cross-sectional view of a second embodiment of the present invention.

Referring now to FIG. 2, a second embodiment of the present invention 10' is shown in a partial cross sectional view. A housing or reaction chamber 36 is provided. This reaction chamber 36 can be any shape, including but not limited to cylindrical, hexagonal, rectangular, or square. Located within this reaction chamber 36 are a plurality of downward extending bubble tubes 34. These bubble tubes 34 are preferably 0.1875 to 0.3125 inches in diameter, and are preferably cylindrical tubes. However, other sized and shapes of bubble tubes are also envisioned.

These bubble tubes 34 are fluidly connected with the bubbler air inlet 28 for allowing a supply of air to be transported through said bubble tubes and bubbled through a level of fuel 46 present within the reaction chamber 36. It is preferred that this supply of air come from a regulated source, such as the type present on typical internal combustion engines and regulated by a vacuum regulator. These bubbles 38 cause the atomization and vaporization of the fuel 46 present within the reaction chamber 36.

It is also preferred, but not mandatory, to use a mist barrier 50 to inhibit the transfer to the carburetor of mist particles that have not expanded to gas. These mist particles will then settle and be later expanded into gas state. It is preferred that the mist barrier be comprised of a material that is not effected by gasoline, fuels and/or fuel additives likely to be utilized with the present invention.

As necessary, liquid fuel is supplied to the reaction chamber 36 through use of a fuel inlet 30. The level of fuel within the reaction chamber is controlled through use of a float chamber 18, preferably in the standard manner. Control of the level of fuel is necessary to provide a minimum depth of fuel within the reaction chamber, particularly at least enough to keep the lower ends of the bubble tubes submerged.

Attaching to the present invention 10 is an air-fuel mix conduit 48. While in the embodiment shown, this conduit 48 extends through the center of the reaction chamber 36, it is envisioned that the conduit 48 can just as easily attach to the reaction chamber at another location, such as the side of the reaction chamber 36. The conduit 48 preferably extends between the air intake of the automobile to the intake manifold 22 of the engine. Alternatively, a collection means could be provided for collecting the expanded gas vapors storage and later consumption, or the collection means could itself consume the vapors, for instance where the intake manifold is the collection means.

An air-fuel ratio inlet valve means 32 is utilized to control the vacuum level in the reaction chamber and the intake of air into the air-fuel mix conduit 48, and a throttle 44 can further be utilized to control the amount of air-fuel mix exiting the conduit 48 for combustion in the engine.

In use, airflow 40 is inputted into the invented fuel expansion system 10 through supply into the bubbler inlet 28. From this bubbler inlet 28, airflow 40 will travel through the bubble tubes 34, these bubble tubes having a lower end which is submerged below the level of fuel 46. As this airflow passes through these tubes, bubbles 38 bubble out the bottom of the bubble tubes 34. This results in the mixing of atomized/vaporized fuel with the airflow and results in expanding the fuel with the use of vacuum energy. Heating the fuel supplements this process. The vacuum energy that is present in the chamber is created through use of a typical vacuum system attached to the engine. A vacuum regulator 52 is utilized to regulate the vacuum and thereby control the expansion of the fuel. This expanded/atomized/vaporized fuel mixture is mixed into the airflow 40. This airflow 40 is then ultimately joined into the air-fuel mix conduit 48 through use of at least one vapor exit conduit 42 or "outlet". This fuel vapor laden airflow mix is then fed into the intake manifold 22 of an engine in the standard manner.

A vacuum has to be maintained in the entire unit, preferably along with the presence of heat energy, to pull apart the hydrocarbon molecular bonds and let them become usable expanded fuel. A special valve system must be in place to regulate the vacuum and provide for proper air-fuel ratio to be introduced into the engine's combustion chamber. The vacuum and heat energy is required to pull the hydrocarbon bonds apart and let oxygen into the molecular chain to become a more useable form of fuel. The fuel that is created is a lighter, more explosive type of fuel. The product created by the invented process is also deemed included in this disclosure.

The bubbler tubes introduce small air bubbles into the liquid fuel that start the expansion process. As the air bubbles enter the fuel, the vacuum quickly expands the bubbles and breaks them. While this is happening, the fuel becomes activated and the molecular bonds are being separated by #3. The vacuum is being maintained in the expansion chamber. The valve system is required to provide a suitable control on the vacuum and to provide a control on the internal combustion engine's operating RPM.

The invented device is not necessarily limited to being a carburetor for use on internal combustion engines. The invented device may also be utilized as a enriched and expanded fuel generator. Likewise, the present invention could further be defined as the product arrived at through use of the process enumerated in this disclosure.

While there is shown and described the present preferred embodiment of the invention, it is to be distinctly understood that this invention is not limited thereto but may be variously embodied to practice within the scope of the following claims.

I claim:

1. A fuel enriching carburetor device for an internal combustion engine, said device comprising: a reaction chamber operable to hold a supply of liquid fuel at a selected level therein, said reaction chamber provided with a plurality of generally vertically extending air tubes; said air tubes having a first end extending to a second end, said first end fluidly connected to a source of air, said source of air regulated through use of a vacuum regulator, said second end submerged below said selected level of liquid fuel; said reaction chamber defining an air-fuel vapor chamber, said air-fuel vapor chamber connecting to at least one air-fuel vapor mixing conduit in fluid communication between the air-fuel vapor chamber of said reaction chamber and an intake manifold of said engine; and said air-fuel vapor mixing conduit for delivering a supply of air-fuel mixture to the engine, said air-fuel vapor mixing chamber further comprising an air-fuel ratio inlet valve means for controlling airflow into said air-fuel vapor mixing conduit.

2. The fuel enriching carburetor device of claim 1 further comprising fuel float means for controlling the liquid fuel level within said reaction chamber.

3. The fuel enriching carburetor device of claim 1 wherein said air-fuel vapor mixing conduit is provided with a mixing valve for controlling the air-fuel ratio provided to said engine.

4. The fuel enriching carburetor device of claim 1 further comprising a preheater for heating said supply of liquid fuel.

5. The fuel enriching carburetor device of claim 1 wherein said bubble tubes are cylindrical and of a diameter between 0.1875 inches and 0.3125 inches.

6. The fuel enriching carburetor device of claim 1 further comprising a mounting flange connection for connecting said air-fuel vapor mixing conduit to an intake manifold of said engine.

7. A fuel enriching carburetor device for an internal combustion engine, said device comprising:

a reaction chamber operable to hold a quantity of liquid fuel at a selected level therein, said reaction chamber provided with a plurality of generally vertically extending air tubes, said air tubes having a first end extending to a second end, said first end fluidly connected to a source of air, said source of air regulated through use of a vacuum regulator, said second end submerged below said selected level of liquid fuel so that air supplied through said air tubes is bubbled through said quantity of liquid fuel, the bubbling of said air through said level of fuel resulting in the vaporization of said fuel, and further the expansion of said fuel; and a preheater for heating said quantity of liquid fuel;

wherein said reaction chamber further defining an air-fuel vapor chamber, said air-fuel vapor chamber connecting to at least one air-fuel vapor mixing conduit in fluid communication between the air-fuel vapor chamber of said reaction chamber and an intake manifold of said engine, said air-fuel vapor mixing conduit provided with a mixing valve for controlling air-fuel ratio provided to the engine, said air-fuel mixing chamber further comprising an air-fuel ratio inlet valve means for controlling airflow into said air-fuel vapor mixing conduit.

8. The fuel enriching carburetor device of claim 7 further comprising fuel float means for controlling the fuel level within said reaction chamber.

9. The fuel enriching carburetor device of claim 7 wherein said bubble tubes are cylindrical and of a diameter between 0.1875 inches and 0.3125 inches.

10. The fuel enriching carburetor device of claim 7 further comprising a mounting flange connection for connecting said air-fuel vapor mixing conduit to an intake manifold of said engine.

* * * * *